(12) United States Patent
Ilitchev et al.

(10) Patent No.: US 9,177,033 B2
(45) Date of Patent: Nov. 3, 2015

(54) SYSTEMS AND METHODS FOR COMPOSITE PERSISTENCE UNITS

(75) Inventors: Andrei Ilitchev, Ottawa (CA); James Sutherland, Ottawa (CA); Douglas Clarke, Ottawa (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/332,148

(22) Filed: Dec. 20, 2011

(65) Prior Publication Data

US 2013/0086119 A1 Apr. 4, 2013

Related U.S. Application Data

(60) Provisional application No. 61/542,008, filed on Sep. 30, 2011.

(51) Int. Cl.
*G06F 17/30* (2006.01)

(52) U.S. Cl.
CPC ................................ *G06F 17/30557* (2013.01)

(58) Field of Classification Search
CPC ..................... G06F 17/30156; G06F 17/30557
USPC ........................................ 707/792, 999.2, 602
See application file for complete search history.

(56) References Cited

U.S. PATENT DOCUMENTS

| | | | |
|---|---|---|---|
| 5,937,409 A | 8/1999 | Wetherbee | |
| 6,134,559 A * | 10/2000 | Brumme et al. | 1/1 |
| 6,633,889 B2 * | 10/2003 | Dessloch et al. | 1/1 |
| 6,912,520 B2 * | 6/2005 | Hankin et al. | 1/1 |
| 6,999,956 B2 * | 2/2006 | Mullins | 1/1 |
| 7,526,490 B2 | 4/2009 | Doughan | |
| 7,536,409 B2 * | 5/2009 | Barcia | 1/1 |
| 7,565,376 B2 * | 7/2009 | Stegmann et al. | 1/1 |
| 7,653,651 B1 * | 1/2010 | Pavlov | 707/999.103 |
| 7,689,535 B2 * | 3/2010 | Bernard | 707/999.001 |
| 7,694,293 B2 | 4/2010 | Rao | |
| 7,702,649 B1 * | 4/2010 | Bresch et al. | 707/999.104 |
| 7,739,223 B2 | 6/2010 | Vaschillo | |
| 7,870,146 B2 * | 1/2011 | Babb et al. | 707/763 |

(Continued)

OTHER PUBLICATIONS

King et al., Hibernate Reference Documentation 3.3.2.GA, published Jun. 24, 2009, available at http://docs.jboss.org/hibernate/orm/3.3/reference/en-US/html/, labelled A015 NPL Hibernate.

(Continued)

*Primary Examiner* — Miranda Le
(74) *Attorney, Agent, or Firm* — Tucker Ellis LLP (57) ABSTRACT

In an EclipseLink environment, persistence units are associated with a single data source. However, in accordance with an embodiment, a user can define multiple persistence units, each with a different set of entity types (i.e., classes) stored in multiple data sources, and expose them through a single composite persistence unit which combines the entities from across the multiple data sources through a single persistence context. A plurality of different types of data sources can be used, including Java Transaction API (JTA) and non-JTA data sources as well as EclipseLink's native JDBC connection pools. Each member persistence unit continues mapping its classes to its own data source. Therefore, a composite persistence unit allows one to map different entities to different data sources. Composite persistence units can be created at runtime.

20 Claims, 4 Drawing Sheets

(56) References Cited

U.S. PATENT DOCUMENTS

| | | | |
|---|---|---|---|
| 7,873,611 B2* | 1/2011 | Ebersole | 707/701 |
| 7,984,082 B2* | 7/2011 | Heider et al. | 707/809 |
| 8,032,560 B2* | 10/2011 | Heider et al. | 707/796 |
| 8,260,643 B2 | 9/2012 | Benayon | |
| 8,266,576 B2 | 9/2012 | Lam | |
| 8,671,404 B2 | 3/2014 | DeHaan | |
| 8,706,800 B1 | 4/2014 | Ahmed | |
| 2003/0046266 A1* | 3/2003 | Mullins et al. | 707/1 |
| 2003/0110279 A1 | 6/2003 | Banerjee et al. | |
| 2005/0234931 A1 | 10/2005 | Yip et al. | |
| 2005/0262475 A1 | 11/2005 | Halpern | |
| 2005/0262499 A1 | 11/2005 | Read | |
| 2006/0294493 A1* | 12/2006 | Melby | 717/104 |
| 2007/0198564 A1 | 8/2007 | Blackstone | |
| 2007/0271210 A1 | 11/2007 | Heider et al. | |
| 2007/0288892 A1 | 12/2007 | Foti | |
| 2008/0034364 A1 | 2/2008 | Lam | |
| 2008/0162483 A1 | 7/2008 | Becker | |
| 2008/0320441 A1* | 12/2008 | Ahadian et al. | 717/108 |
| 2009/0063213 A1 | 3/2009 | Benayon | |
| 2009/0112908 A1 | 4/2009 | Wintel et al. | |
| 2009/0204961 A1 | 8/2009 | DeHaan | |
| 2009/0281982 A1* | 11/2009 | Nigul et al. | 707/1 |
| 2010/0122239 A1* | 5/2010 | Neufeld et al. | 717/131 |
| 2010/0161648 A1 | 6/2010 | Eberlein et al. | |
| 2010/0287208 A1* | 11/2010 | Mao et al. | 707/803 |
| 2011/0145194 A1 | 6/2011 | Figus et al. | |
| 2011/0153576 A1 | 6/2011 | Figus | |
| 2011/0154253 A1 | 6/2011 | Lehr et al. | |
| 2011/0321010 A1* | 12/2011 | Wang | 717/116 |
| 2012/0023067 A1* | 1/2012 | Clegg et al. | 707/634 |
| 2012/0284234 A1* | 11/2012 | Mashtizadeh et al. | 707/655 |
| 2012/0324419 A1 | 12/2012 | Roberts | |
| 2013/0117346 A1 | 5/2013 | Figus | |
| 2013/0219060 A1 | 8/2013 | Sturgeon | |

OTHER PUBLICATIONS

Rekadze et al., Developer's Guide for Oracle TopLink, 11g Release 1, published Sep. 2008, available at http://docs.oracle.com/cd/E15051_01/index.htm, labelled A025 NPL Oracle Toplink.

Soffiato, R. et al., Using Existing Hibernate Data Models and Multi-Tenant Plugin, published Sep. 20, 2010, available at http://grails.1312388.n4.nabble.com/Using-Existing-Hibernate-Data-Models-Multi-Tenantplugin-, td2547659.html, labelled A027 NPL Grails.

\* cited by examiner

SYSTEMS AND METHODS FOR COMPOSITE PERSISTENCE UNITS

CLAIM OF PRIORITY

This application claims benefit to the following U.S. Provisional Patent Application: U.S. Provisional Patent Application No. 61/542,008 entitled "SYSTEMS AND METHODS FOR COMPOSITE PERSISTENCE UNITS," by Andrei Ilitchev et al., filed Sep. 30, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD Of INVENTION

The present invention is generally related to an application server environment and to persistence of data in the application server environment, and is particularly related to systems and methods for composite persistence units.

BACKGROUND

EclipseLink is an object-persistence and object-transformation framework that provides development tools and runtime capabilities which can reduce development and maintenance efforts, and increase enterprise application functionality. An implementation of the Java Persistence API (JPA) framework is provided by Eclipselink, which enables java classes and objects to be stored in data sources, allowing information to be used across sessions. Using EclipseLink, software applications can be built which store persistent object-oriented data in a relational database; and can be used to transform object-oriented data into either relational data or Extensible Markup Language (XML) elements.

In EclipseLink, application defined objects which have been made persistable are referred to as entities. Entities are managed by an entity manager, which enables various operations to be performed on the entities. Entity managers can be created and configured using a persistence unit, which can be defined in a persistence.xml file.

SUMMARY

In an EclipseLink environment, persistence units are associated with a single data source. However, in accordance with an embodiment, a user can define multiple persistence units, each with a different set of entity types (i.e., classes) stored in multiple data sources, and expose them through a single composite persistence unit which combines the entities from across the multiple data sources through a single persistence context. A plurality of different types of data sources can be used, including Java Transaction API (JTA) and non-JTA data sources as well as EclipseLink's native JDBC connection pools. Each member persistence unit continues mapping its classes to its own data source. Therefore, a composite persistence unit allows one to map different entities to different data sources. Composite persistence units can be created at runtime.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In an EclipseLink environment, persistence units are associated with a single data source. However, in accordance with an embodiment, a user can define multiple persistence units, each with a different set of entity types (i.e., classes) stored in multiple data sources, and expose them through a single composite persistence unit which combines the entities from across the multiple data sources through a single persistence context. A plurality of different types of data sources can be used, including Java Transaction API (JTA) and non-JTA data sources as well as EclipseLink's native JDBC connection pools. Each member persistence unit continues mapping its classes to its own data source. Therefore, a composite persistence unit allows one to map different entities to different data sources. Composite persistence units can be created at runtime.

Figure 1:
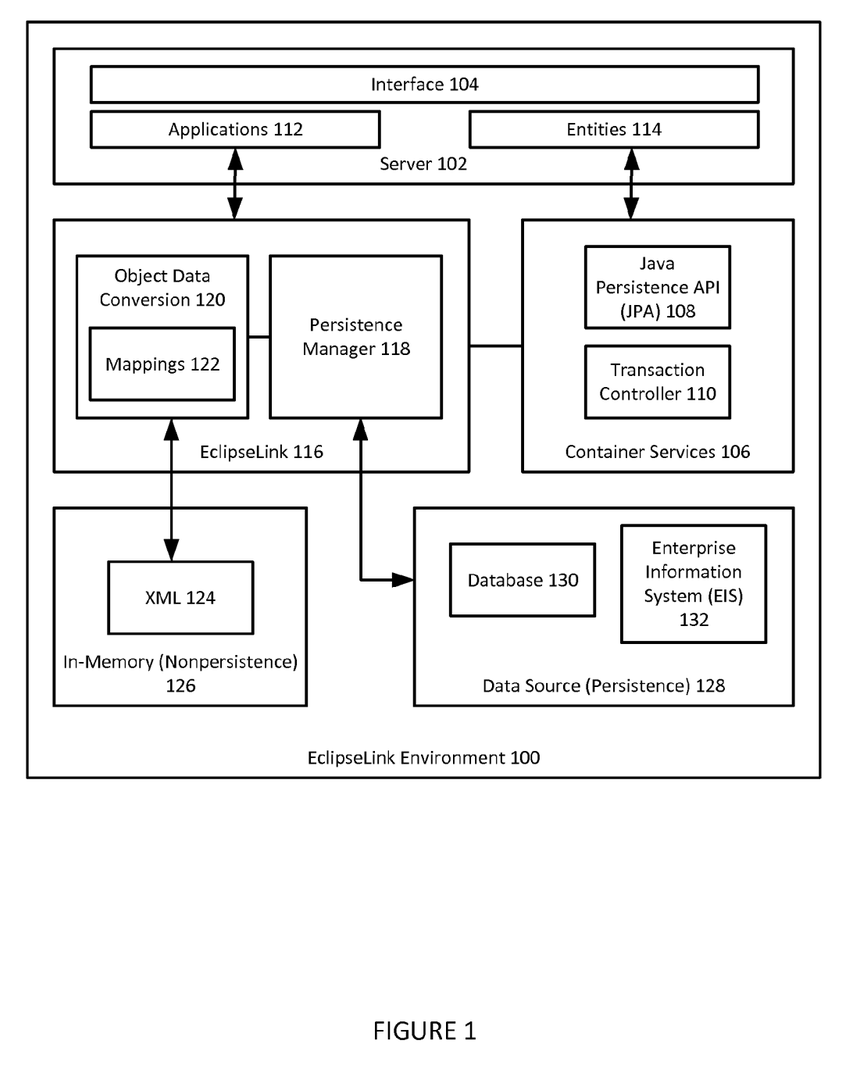
FIG. 1 shows a block diagram of an EclipseLink environment, in accordance with an embodiment.

FIG. 1 shows an illustration of an EclipseLink environment, in accordance with an embodiment. As noted above, persistent applications can be developed using EclipseLink. As shown in FIG. 1, the EclipseLink environment 100 can include a server 102, which includes an interface 104 through which the EclipseLink environment can be accessed, and a plurality of container services 106 such as an implementation of the Java Persistence API (JPA) 108 and a transaction controller 110. The implementation of the Java Persistence API (JPA) framework, provided by EclipseLink, enables applications 112 to define objects that are to be made persistent. In JPA, these application-defined objects are called entities 114. Entities have persistent identities (i.e., instances can be uniquely identified and distinguished from one another); and are transactional (i.e., an entity is created, updated and deleted within a transaction, and a transaction is required for the changes to be committed in the database). However, in-memory entities can be changed without the changes being persisted. Additionally, an entity is a fine-grained object that has a set of aggregated state that is typically stored in a single place (such as a row in a table), and has relationships to other entities.

Entities can be described using metadata, which can be expressed as annotations (specifically defined types that can be attached to or placed in front of Java programming elements) or in XML (descriptors). An entity manager enables API calls to perform operations on an entity. Until an entity manager is used to create, read, or write an entity, the entity is just a regular nonpersistent object. When an entity manager obtains a reference to an entity, that entity becomes managed by the entity manager. The set of managed entity instances within an entity manager at any given time is called its persistence context. The entity manager can be configured to persist or manage certain types of objects and read or write to a particular data source. Entity managers can be provided by an entity manager factory which can be configured by a persistence unit. Persistence units can be named to allow differentiation between the entity manager factory objects with which they are associated. This way an application obtains control over which configuration to use for operations on a specific entity. Persistence units can be defined in a persistence.xml file.

The EclipseLink environment also includes a persistence manager 118 and an object data conversion module 120, and can be used with a variety of Java architectures. As shown in FIG. 1, a plurality of mappings 122 can be maintained to XML representations 124 stored in memory 126. The persistence manager can communicate with one or more data sources 128 such as a database 130 or Enterprise Information System (EIS) 132. Relational databases can be used for transactional persistence of Java objects using Java Database Connectivity (JDBC) drivers. An EIS can be used for transactional persistence of Java objects to a nonrelational data source accessed using a Java EE Connector architecture (JCA) adapter, and any supported EIS record type, including indexed, mapped, or XML.

Composite Persistence Units

Generally, each persistence unit is associated with a single data source. However, in accordance with an embodiment, a user can define multiple persistence units, each with a different set of entity types (i.e., classes) stored in multiple data sources, and expose them through a single composite persistence unit which combines the entities from across the multiple data sources through a single persistence context. As noted above, a plurality of different types of data sources can be used, including Java Transaction API (JTA) and non-JTA data sources as well as EclipseLink's native JDBC connection pools. Each member persistence unit continues mapping its classes to its own data source. Therefore, a composite persistence unit allows one to map different entities to different data sources. Composite persistence units can be created at runtime.

Figure 2:
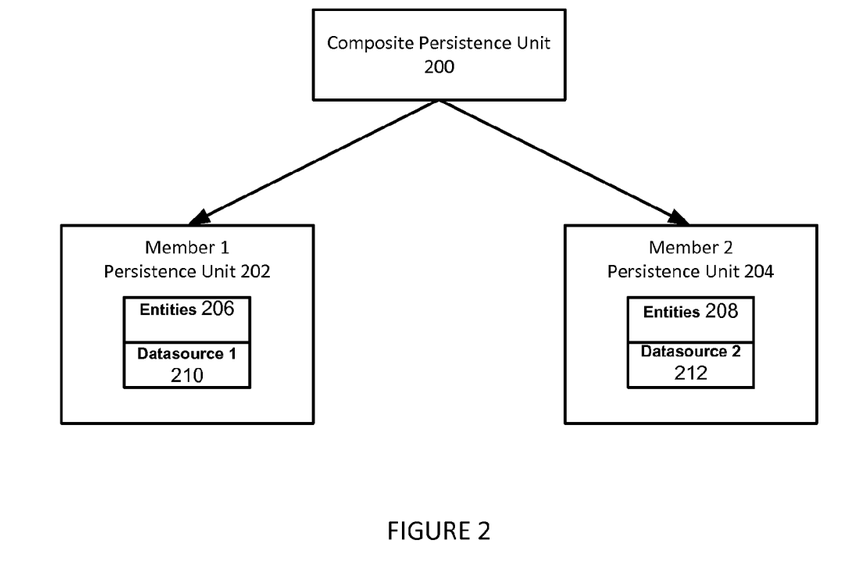
FIG. 2 shows a composite persistence unit, in accordance with an embodiment.

FIG. 2 shows a composite persistence unit, in accordance with an embodiment. A composite persistence unit (PU) can refer to a PU which combines two or more Composite Member PUs (also referred to as member persistent units, or simply persistent units) to provide a persistence context which allows queries and transactions to be made across the combined set of entity types associated with the member PUs. As shown in FIG. 2, composite persistence unit 200 is comprised of two member persistence units, Member 1 202 and Member 2 204. Each member persistent unit includes a plurality of entities 206 and 208 and is associated with a different data source, Data source 1 210 and Data source 2 212.

In accordance with an embodiment, the composite persistence unit can be configured using a persistence.xml configuration file. The configuration file can indicate which member persistence units are included in the composite persistence unit. For example, the member persistence units can be indicated by their jar file names and specified by <jar-file> elements in the configuration file. Additionally, a property can be defined in the configuration file which specifies that this persistence unit is a composite persistence unit. For example, <property name="eclipselink.composite-unit" value="true"/>.

Figure 3:
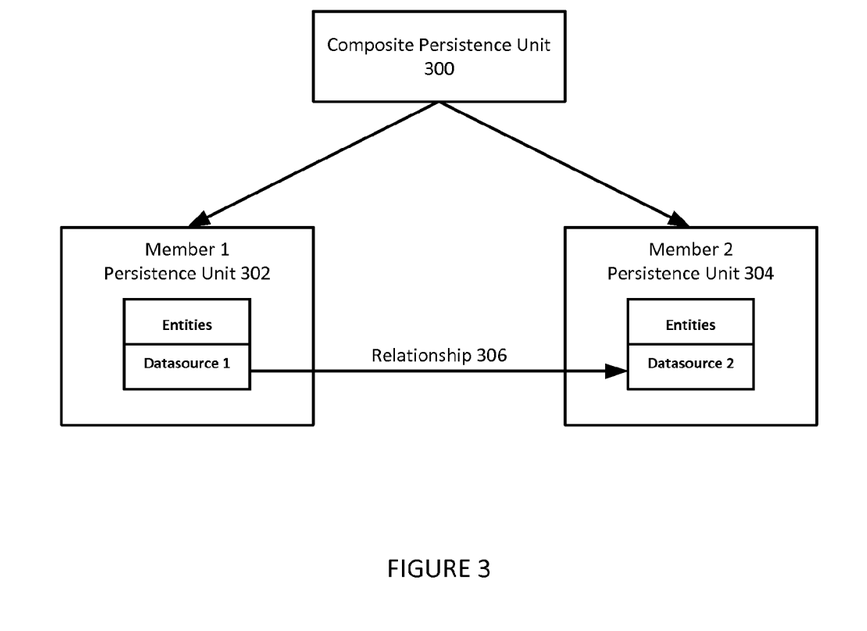
FIG. 3 shows a composite persistence unit which includes relationships between members, in accordance with an embodiment.

FIG. 3 shows a composite persistence unit which includes relationships between members, in accordance with an embodiment. In accordance with an embodiment, persistence units can have relationships (e.g., dependencies) to other persistence units. For example, classes in one persistence unit, which are persisted to one data source, can include references to classes within a different persistence unit. As shown in FIG. 3, composite persistence unit 300 includes two member persistence units 302 and 304. In this example, member persistence unit 1 has a relationship 306 with member persistence unit 2. For example, one or more classes in member persistence unit 1 can depend on data received from classes in member persistence unit 2. Persistence units which are dependent on other persistence units, must be members of a composite persistence unit. Accordingly, these member composite persistence units can be configured using a persistence.xml configuration file, to indicate their relationship(s) with other persistence units. For example, this can be done by setting a composite member persistence unit property to "true" in the configuration file. If this property is set to "true" then an attempt to create an entity manager using this member persistence unit will throw an exception.

In accordance with an embodiment, properties can be passed from the composite persistent unit, to the member persistent units when creating an entity manager factory using the composite persistence unit. Properties can be specified for each member persistence unit. For example, the properties can be passed as a map, where each member persistence unit's name is the key, as shown below in Listing 1.

Listing 1

```
eclipselink.composite-unit.properties" -> (
    ("memberPu1" -> ( "javax.persistence.jdbc.user" -> "user1",
        "javax.persistence.jdbc.password" -> "password1",
        "javax.persistence.jdbc.driver" -> "oracle.jdbc.OracleDriver",
        "javax.persistence.jdbc.url" ->
"jdbc:oracle:thin:@oracle_db_url:1521:db",
        ),
    ("memberPu2" -> ( "javax.persistence.jdbc.user" -> "user2",
        "javax.persistence.jdbc.password" -> "password2",
        "javax.persistence.jdbc.driver" -> "com.mysql.jdbc.Driver",
        "javax.persistence.jdbc.url" ->
        "jdbc:mysql://my_sql_db_url:3306/user2",
        )
)
```

In accordance with an embodiment, transaction type can be specified in the composite persistence unit, while any transaction types specified by composite members are ignored. Additionally, data sources can be specified by each member persistence unit, while those specified in the composite can be ignored. For example, a composite PU can specify the transaction type and server platform, as well as identify the included persistence units defined in jar files, as shown below in Listing 2.

Listing 2

```
<persistence      xmlns=http://java.sun.com/xml/ns/persistence
                  xmlns:xsi="http://www.w3.org/2001/XMLSchema-instance"
                  xsi:schemaLocation="http://java.sun.com/xml/ns/persistence
                  persistence_1_0.xsd" version="1.0">
    <persistence-unit name="compositePu" transaction-type="JTA">
        <provider>
            org.eclipse.persistence.jpa.PersistenceProvider
        </provider>
        <jar-file>member1.jar</jar-file>
        <jar-file>member2.jar</jar-file>
        <properties>
            <property name="eclipselink.composite-unit" value="true"/>
            <property name="eclipselink.target-server" value="WebLogic_10"/>
        </properties>
    </persistence-unit>
</persistence>
```

As noted above, the member persistence units can specify a data source (e.g., by using a <data-source>tag). Each member persistence unit can also specify whether it can be used independently, or if it must be used within a composite persistence unit (e.g., by setting a composite-member property). Examples of configurations for member persistence units are shown below in Listings 3 and 4.

Listing 3

```
<persistence      xmlns="http://java.sun.com/xml/ns/persistence"
                  xmlns:xsi="http://www.w3.org/2001/XMLSchema-instance"
                  xsi:schemaLocation="http://java.sun.com/xml/ns/persistence
                  persistence_1_0.xsd" version="1.0">
    <persistence-unit name="memberPu1" transaction-type="JTA">
        <provider>
            org.eclipse.persistence.jpa.PersistenceProvider
        </provider>
        <mapping-file>META-INF/advanced-entity-mappings1.xml</mapping-file>
        <jta-data-source>jdbc/OracleJtaDS</jta-data-source>
        <exclude-unlisted-classes>false</exclude-unlisted-classes>
        <properties>
            <property name="eclipselink.target-server" value="WebLogic_10"/>
            <property name="eclipselink.target-database"
value="org.eclipse.persistence.platform.database.Oracle.Oracle11Platform"/>
        </properties>
    </persistence-unit>
</persistence>
```

Listing 4

```
persistence       xmlns="http://java.sun.com/xml/ns/persistence"
                  xmlns:xsi="http://www.w3.org/2001/XMLSchema-instance"
                  xsi:schemaLocation="http://java.sun.com/xml/ns/persistence
                  persistence_1_0.xsd" version="1.0">
    <persistence-unit name="memberPu2">
        <provider>
            org.eclipse.persistence.jpa.PersistenceProvider
        </provider>
        <mapping-file>META-INF/advanced-entity-mappings2.xml</mapping-file>
        <jta-data-source>jdbc/MySqlJtaDS</jta-data-source>
        <exclude-unlisted-classes>false</exclude-unlisted-classes>
        <properties>
            <property name="eclipselink.composite-unit.member" value="true"/>
            <property name="eclipselink.target-database"
value="org.eclipse.persistence.platform.database.MySQLPlatform"/>
        </properties>
    </persistence-unit>
</persistence>
```

Each persistence unit, including the composite and member persistence units, can be embodied as jar files. In accordance with an embodiment, these jar files can be deployed on the same class loader. In an application server, the jars can by packed in an ear file; or in a standalone case, the jar files can be put on the class pass.

Figure 4:
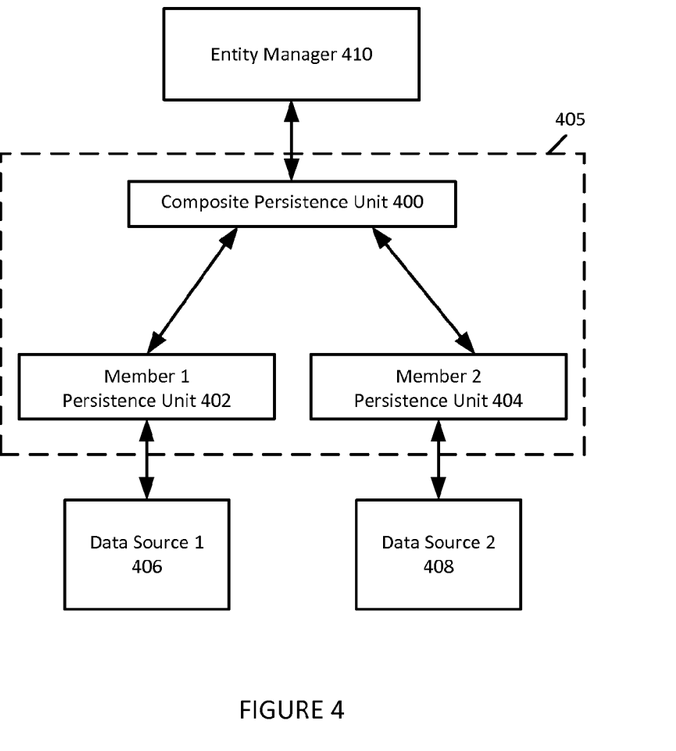
FIG. 4 shows a composite persistence unit and entity manager, in accordance with an embodiment.

FIG. 4 shows a composite persistence unit and entity manager, in accordance with an embodiment. As shown in FIG. 4, composite persistence unit 400 can include a plurality of persistence units, such as member persistence units 1 and 2 (402, 404), and can appear to and be utilized by applications as a single persistence unit 405. Each member persistent unit can be associated with a different data source (406, 408). An entity manager serves as an interface with a persistence unit, enabling management of the entities which are stored therein. Each entity manager can be created using the persistence unit associated with it. As shown in FIG. 4, a single entity manager 410 can be created using the composite persistence unit. This entity manager can be used to manage all of the member persistence units associated with the composite persistence unit.

In accordance with an embodiment, a composite PU can be accessed either through injection (for example when used in an application server environment), as shown in Listing 5, or using persistence, as shown in Listing 6.

Listing 5.

```
@PersistenceUnit(unitName="compositePu")
EntityManagerFactory entityManagerFactory;
@PersistenceUnit(unitName="compositePu")
EntityManager entityManager;
```

Listing 6.

```
EntityManagerFactory entityManagerFactory =
    Persistence.createEntityManagerFactory("compositePu", properties);
```

In accordance with an embodiment, Persistence Unit Properties can be specified in an associated persistence.xml configuration file.

In accordance with an embodiment, Composite Entity Manager Properties can be directly passed to the createEntityManager method or the setProperty method. Composite member properties can be passed to the same methods using the "eclipselink.composite.properties" property.

In accordance with an embodiment, extensions can be specified using ElementCollection with primitive type target values with CollectionTable defined in a different composite member persistence unit using annotations, as shown in Listing 7, or an orm.xml file, as shown in Listing 8.

Listing 7.

```
@ElementCollection( )
@CollectionTable(name = "MBR1_RESPONS",
joinColumns=@JoinColumn(name="EMP_ID"))
@CompositeMember("composite-advanced-member_1")
@Column(name = "DESCRIPTION")
public Collection<String> getResponsibilities( ) {
    return responsibilities;
}
```

Listing 8.

```
<element-collection name="responsibilities" composite-
member="xml-composite-advanced-member_3">
    <column name="DESCRIPTION"/>
    <collection-table name="XML_MBR3_RESPONS">
        <join-column name="EMP_ID"/>
    </collection-table>
</element-collection>
```

In accordance with an embodiment, no @CompositeMember annotation (or composite-member attribute) is required if CollectionTable is defined in the same composite member persistence unit as the source.

Figure 5:
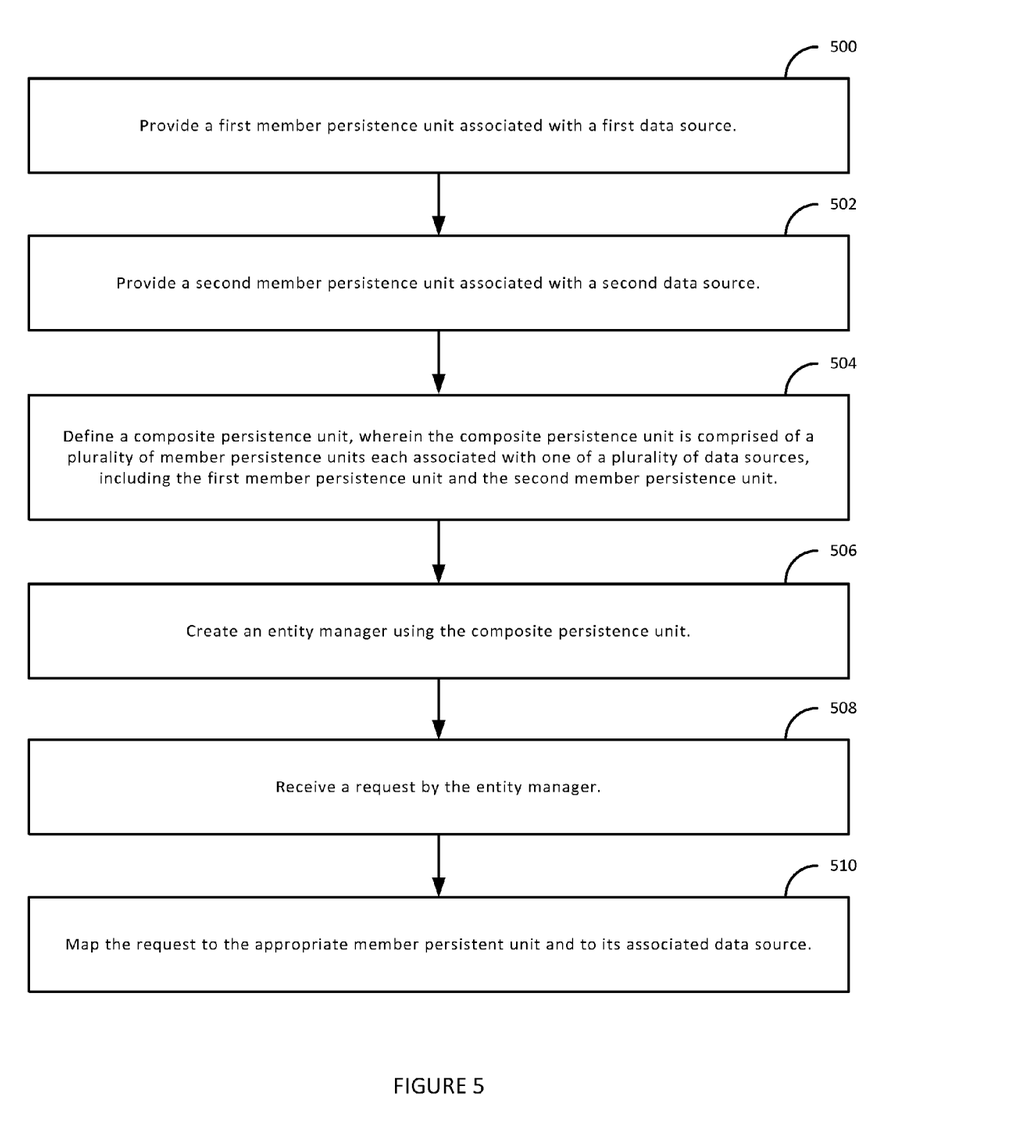
FIG. 5 shows a method for using multiple data sources with a composite persistence unit.

FIG. 5 shows a method for using multiple data sources with a composite persistence unit, in accordance with an embodiment. At step 500, a first member persistence unit associated with a first data source is provided. At step 502, a second member persistence unit associated with a second data source is provided. At step 504, a composite persistence unit is defined. The composite persistence unit is comprised of a plurality of member persistence units each associated with one of a plurality of data sources, including the first member persistence unit and the second member persistence unit. At step 506, an entity manager is created using the composite persistence unit. At step 508, a request is received by the entity manager. At step 510, the request is mapped to the appropriate member persistent unit and to its associated data source.

In accordance with an embodiment, the method shown in FIG. 5 can also include that a member persistence unit which does not have a relationship to any other member persistence unit can be a second composite persistence unit. Additionally, each member persistence unit is included in the composite persistence unit as a Java archive file. Also, each member persistence unit specifies its associated data source and wherein any data source specified by the composite persistence unit is ignored. The composite persistence unit specifies a transaction type and wherein any transaction type specified by the plurality of member persistence units is ignored. Each of the plurality of data sources can be one of a schema, table-space and database.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A server system, comprising:
a computer including one or more microprocessors;
a composite persistence unit, executing on the computer, that includes a plurality of member persistence units, wherein each of the plurality of member persistence units includes a different set of objects and is associated with a different data source, wherein states of the different set of objects are persisted to the different data source, and wherein the composite persistence unit provides a persistence context which configures queries and transactions to be performed across a combined set of objects from the plurality of member persistence units;

a configuration file for the composite persistence unit, wherein the configuration file defines properties of each of the plurality of member persistence units, including a property for determining whether a persistence unit is a member persistence unit of the composite persistence unit, and specifies a dependency or reference relationship between one or more objects in a first member persistence unit of the composite persistence unit and one or more objects in a second member persistence unit of the composite persistence unit, wherein the one or more objects in the first member persistence unit include one or more references to, or depend on data received from, the one or more objects in the second member persistence units; and an entity manager created using the composites persistence unit, wherein the entity manager serves as an interface to the composite persistence unit, operates to manage the member persistence units therein, and maps a request received by the entity manager to an appropriate member persistence unit.

2. The server system of claim 1, wherein each of the plurality of member persistence units is included in the composite persistence unit as a java archive file.

3. The server system of claim 1, wherein each of the plurality of member persistence units specifies its associated data source and wherein any data source specified by the composite persistence unit is ignored.

4. The server system of claim 1, wherein the composite persistence unit specifies a transaction type and wherein any transaction type specified by the plurality of member persistence units is ignored.

5. The server system of claim 1, wherein the different data source is one of a schema, table-space and database.

6. The system of claim 1, wherein the configuration file is an XML file.

7. A method for using multiple data sources with a composite persistence unit, comprising:

defining a composite persistence unit that includes a plurality of member persistence units, wherein each of the plurality of member persistence units includes a different set of objects and is associated with a different data source, wherein states of the different set of objects are persisted to the different data source, and wherein the composite persistence unit provides a persistence context which configures queries and transactions to be performed across a combined set of objects from the plurality of member persistence units;

providing a configuration file for the composite persistence unit, wherein the configuration file defines properties of each of the plurality of member persistence units in the composite persistence unit, including a property for determining whether a persistence unit is a member persistence unit of the composite persistence unit, and specifies a dependency or reference relationship between one or more objects in a first member persistence unit of the composite persistence unit and one or more objects in a second member persistence unit of the composite persistence unit, wherein the one or more objects in the first member persistence unit include one or more references to, or depend on data received from, the one or more objects in the second member persistence units;

creating an entity manager using the composite persistence unit, wherein the entity manager serves as an interface to the composite persistence unit, and operates to manage the member persistence units in the composite persistence unit;

receiving a request by the entity manager; and mapping the request to an appropriate member persistence unit via the entity manager.

8. The method of claim 7, wherein each of the plurality of member persistence units is included in the composite persistence unit as a java archive file.

9. The method of claim 7, wherein each of the plurality of member persistence units specifies its associated data source and wherein any data source specified by the composite persistence unit is ignored.

10. The method of claim 7, wherein the composite persistence unit specifies a transaction type and wherein any transaction type specified by the plurality of member persistence units is ignored.

11. The method of claim 7, wherein the different data source is one of a schema, table-space and database.

12. The method of claim 7, wherein the configuration file is an XML file.

13. A non-transitory computer readable storage medium, including instructions stored thereon which, when executed by a computer, cause the computer to perform the steps comprising:

defining a composite persistence unit that includes a plurality of member persistence units, wherein each of the plurality of member persistence units includes a different set of objects and is associated with a different data source, wherein states of the different set of objects are persisted to the different data source, and wherein the composite persistence unit provides a persistence context which configures queries and transactions to be performed across a combined set of objects from the plurality of member persistence units;

providing a configuration file for the composite persistence unit, wherein the configuration file defines properties of each of the plurality of member persistence units in the composite persistence unit, including a property for determining whether a persistence unit is a member persistence unit of the composite persistence unit, and specifies a dependency or reference relationship between one or more objects in a first member persistence unit of the composite persistence unit and one or more objects in a second member persistence unit of the composite persistence unit, wherein the one or more objects in the first member persistence unit include one or more references to, or depend on data received from, the one or more objects in the second member persistence units;

creating an entity manager using the composite persistence unit, wherein the entity manager serves as an interface to the composite persistence unit, and operates to manage the member persistence units in the composite persistence unit;

receiving a request by the entity manager; and mapping the request to an appropriate member persistence unit via the entity manager.

14. The non-transitory computer readable storage medium of claim 13, wherein each of the plurality of member persistence units is included in the composite persistence unit as a java archive file.

15. The non-transitory computer readable storage medium of claim 13, wherein each of the plurality of member persistence units specifies its associated data source and wherein any data source specified by the composite persistence unit is ignored.

16. The non-transitory computer readable storage medium of claim 13, wherein the composite persistence unit specifies a transaction type and wherein any transaction type specified by the plurality of member persistence units is ignored.

17. The non-transitory computer readable storage medium of claim 13, wherein the different data source is one of a schema, table-space and database.

18. The non-transitory computer readable storage medium of claim 13, wherein the configuration file is an XML file.

19. The system of claim 1, wherein at least one of the different set of objects in each of the plurality member persistence units is a Java object.

20. The method of claim 7, wherein at least one of the different set of objects in each of the plurality member persistence units is a Java object.

* * * * *

UNITED STATES PATENT AND TRADEMARK OFFICE
CERTIFICATE OF CORRECTION

PATENT NO. : 9,177,033 B2  
APPLICATION NO. : 13/332148  
DATED : November 3, 2015  
INVENTOR(S) : Ilitchev et al.

Page 1 of 1

It is certified that error appears in the above-identified patent and that said Letters Patent is hereby corrected as shown below:

In the Specification

In column 1, line 23, delete "Of" and insert -- OF --, therefor.

In column 1, line 37, delete "Eclipselink," and insert -- EclipseLink, --, therefor.

In column 6, line 19, delete "can by" and insert -- can be --, therefor.

In column 7, line 46, delete "RESPONS"," and insert -- RESPONSE", --, therefor.

In column 7, line 59, delete "RESPONS">" and insert -- RESPONSE"> --, therefor.

Signed and Sealed this  
Twenty-eighth Day of June, 2016

Michelle K. Lee  
*Director of the United States Patent and Trademark Office*